US005889523A

United States Patent [19]
Wilcox et al.

[11] Patent Number: 5,889,523
[45] Date of Patent: Mar. 30, 1999

[54] METHOD AND APPARATUS FOR DYNAMICALLY GROUPING A PLURALITY OF GRAPHIC OBJECTS

[75] Inventors: Lynn D. Wilcox, Portola Valley; Patrick Chiu, Menlo Park; Gene Golovchinsky, Palo Alto; William N. Schilit, Palo Alto; Joseph W. Sullivan, Palo Alto, all of Calif.

[73] Assignees: Fuji Xerox Co., Ltd., Tokyo, Japan; Xerox Corporation, Stamford, Conn.

[21] Appl. No.: 977,810

[22] Filed: Nov. 25, 1997

[51] Int. Cl.⁶ ........................................................ G06F 3/00
[52] U.S. Cl. .......................... 345/357; 345/358; 345/978; 707/531
[58] Field of Search ................................... 345/357, 358, 345/978; 707/531

[56] References Cited

U.S. PATENT DOCUMENTS

| | | | |
|---|---|---|---|
| 5,404,439 | 4/1995 | Moran et al. | 345/326 |
| 5,471,578 | 11/1995 | Moran et al. | 345/358 |
| 5,548,705 | 8/1996 | Moran et al. | 345/358 |
| 5,598,507 | 1/1997 | Kimber et al. | 704/246 |
| 5,659,662 | 8/1997 | Wilcox et al. | 704/245 |
| 5,784,061 | 6/1996 | Moran et al. | 345/358 |
| 5,790,121 | 9/1996 | Sklar et al. | 345/356 |

OTHER PUBLICATIONS

Sharp Model ZR–5700/ZR–5800 Keyboard enhanced Personal Digital Assistant Operation Manual, Zaurus, Sharp Electronics Corporation, cover page, date page identifying Sharp Electronics Corporation Service and Support page, and pp. 161–165 from Ch. 6 (1996).

Dynomite: A Dynamically Organized Ink and Audio Notebook, L.D. Wilcox et al., CHI 97 conference proceedings, ACM Press, pp. 186–193 (Mar. 1997).

Tivoli: An Electronic Whiteboard for Informal Workgroup Meetings, E.R. Pedersen et al., proceedings of Interchi '93, ACM Press, pp. 391–398 (Apr. 1993).

Automatic partitioning of full–motion video, Zhang et al., Multimedia Systems (1993) 1:10–28, pp. 10–28 (1993).

Image processing on encoded video sequences, Arman et al., Multimedia Systems (1994) 1:211–219, pp. 211–219 (1994).

Video Segmentation Techniques for News, Philips et al., SPIE vol. 2916, pp. 243–251 (1996).

A Feature–Based Algorithm for Detecting and Classifying Scene Breaks, Zabih et al., Multimedia '95, San Francisco, CA, USA, pp. 189–200 (1995).

Computer Vision: Principles, Kasturi et al., IEEE Computer Society Press Tutorial, IEEE Computer Society Press, Ch. 6, pp. 469–480 (1991).

"Aha! software products" 1995.

*Primary Examiner*—John E. Breene
*Assistant Examiner*—X. L. Bautista
*Attorney, Agent, or Firm*—Oliff & Berridge, PLC

[57] ABSTRACT

When dynamically grouping a plurality of graphic objects, such as displayed on a graphic input display apparatus, a cluster tree is formed for the plurality of graphic objects. The cluster tree is based on a plurality of different types of distance measures. These include a time distance and a spatial distance. These distances are combined to form a distance metric indicting a distance between a pair of the graphic objects. Each level of the cluster tree defines a new cluster of the graphic objects. At least one of the graphic objects is selected. The different cluster levels of the cluster tree containing the selected graphic object are displayable. The displayed cluster of the graphic objects can be modified to increase or decrease the cluster level of the cluster containing the selected graphic object.

40 Claims, 14 Drawing Sheets

METHOD AND APPARATUS FOR DYNAMICALLY GROUPING A PLURALITY OF GRAPHIC OBJECTS

BACKGROUND OF THE INVENTION

1. Field of Invention

This invention relates to graphical editing systems. In particular, this invention is directed to a method and an apparatus for dynamically grouping a plurality of graphic objects for graphical editing.

2. Description of Related Art

Grouping of graphic objects is an important interface issue in graphical editing systems, such as systems operating with digital ink, as it allows selecting one or more graphic objects as a single unit. Users select graphic objects for editing operations, such as deleting or moving graphic objects, or for adding properties or data types to the graphic objects. For handwritten notes, the desired selection of graphic objects is typically groups of ink strokes forming a word, a line or a paragraph. In keyboard entry systems, selection is facilitated by the fact that the words, lines and paragraphs are well-defined units, which can be distinguished by space characters between words, paragraph characters between paragraphs and the like. In keyboard entry systems, the user may click on a mouse once to select a word, twice to select a line, or three times to select a paragraph. In contrast, graphic objects, including digital ink strokes, cannot be mapped into meaningful units in this way.

Thus, in typical graphical editing systems, groups of graphic objects are selected by dragging a rectangle over the desired objects. However, if the desired graphic objects are not basically rectangular, for example, in cases where ink strokes as graphic objects are skewed or drawn diagonally, this technique may be disadvantageous.

Another method for grouping graphic objects in graphical editing includes drawing a loop around the graphic objects to indicate the desired grouping. This method is used in Tivoli. Tivoli is described in "Tivoli: An Electronic Whiteboard for Informal Workgroup Meetings", E. Pedersen et al., INTERCHI '93, pages 391–398 (Apr. 24–29, 1993). Tivoli is an electronic whiteboard for informal work group meetings. While drawing a loop around the graphic objects can avoid skew problems, selecting just the strokes of one group is difficult to achieve when strokes from different groups overlap.

Another method for selecting groups of graphic objects or strokes is wiping, as disclosed in U.S. Pat. No. 5,548,705 to Moran et al. (Moran 1). Moran 1 describes a technique for wiping of dynamically selected graphic objects, wherein a special wiping mode is selected and the pen is moved over desired graphic objects or strokes. However, strokes or graphic objects not touched by the wipe may be included according to how close they are to selected graphic objects or strokes, either in actual distance on a page or how closely in time they were created.

In the Sharp Zaurus Model ZR-5700/ZR-5800 operation manual, Sharp Corporation, Mahwah, N.J. 07430, ink strokes as graphic objects are automatically grouped by time, so that strokes made within a certain time threshold are grouped together. However, in this technique, the threshold for grouping strokes is dependent on the writing speed. This technique also does not take into account spatial closeness. Therefore, graphic objects or strokes that are adjacent on a page, but that are made at different times, may not be grouped and it is difficult to separate time-grouped graphic objects or strokes.

In the InkWriter (Aha!) system, "aha! software products", 1995, graphic objects or strokes are written between predrawn lines on the screen and words are recognized based on inter-stroke spacing. This system allows a user to edit handwritten notes using insertion, deletion, cut-and-paste, with the ink or graphic objects being reformatted to fit the screen, as in text word processors.

U.S. Pat. No. 5,404,439 to Moran et al. (Moran 2) describes techniques for dynamically selecting graphic objects by considering their spatial and temporal nearness to the selection, with selection being made by rectangular regions, drawing a loop, or by wiping.

SUMMARY OF THE INVENTION

This invention provides a method and an apparatus that selects graphic objects, such as digital ink, by word, line or paragraph in a manner analogous to selection in a typed-text system.

This invention additionally provides a method and apparatus having an accurate selection technique for graphical editing that is applicable to accurately edit graphic objects such as drawings or other non-text notes.

This invention further provides a method and an apparatus that can reduce the number of cluster levels and the number of alternate groupings a user may need to examine.

The method and apparatus of this invention group the graphic objects using hierarchical agglomerative clustering to form a cluster tree. The cluster tree is based on different types of distances, such as time distance and spatial distance, where the different types of distances are combined into a single distance metric.

The method and apparatus of this invention use the dynamic clustering to infer meaningful groups of graphic objects. The method and apparatus of this invention create a hierarchy of graphic object clusters which roughly correspond to words, lines and paragraphs. The user selects the desired grouping, by pointing or by using gestures, to adjust the cluster level or dynamic grouping level of the graphic objects.

Because the dynamic grouping method and apparatus of this invention do not attempt to classify the graphic objects as words, lines or paragraphs, the selection technique is advantageous and applicable to drawings and other non-text notes, as well as to textual objects such as strokes.

In the method of this invention, the user selects a desired graphic object. A grouping of the other graphic objects "around" the selected graphic object is displayed based on a selected cluster level for that graphic object. The user then can simply increase or decrease the selected cluster level, which increases or decreases the dynamic grouping of the surrounding graphic objects.

In the method of this invention, the graphic objects within the cluster level currently selected by the user are shown by altering some appearance characteristic of the graphic objects within the selected cluster. The appearance characteristic can be shadowing, background shading or coloring, the color of the ink, such as the hue, saturation or luminance, the font, boldness, slant, or any other appearance characteristic. The cluster level can be selected by pointing to a graphic object and altering the cluster level based on the duration of the selection, or dwell.

In the apparatus of this invention, the user selects and modifies the cluster level using an up/down interface, a mouse, a pen gesture or voice activation to increase to a next higher cluster level or to decrease to a next lower cluster level. Alternately, the user can cycle through the various cluster levels by dwelling on the selection. Therefore, the user can easily select a desired cluster level to display a meaningful grouping of the graphic objects, such as in handwritten text, where the graphic objects can be in a non-text format.

These and other features and advantages of this invention are described in or apparent from the following detailed description of the preferred embodiments.

BRIEF DESCRIPTION OF THE DRAWINGS

The invention is described with reference to the following drawings wherein like numerals represent like elements, and wherein.

DETAILED DESCRIPTION OF PREFERRED EMBODIMENTS

Figure 1:
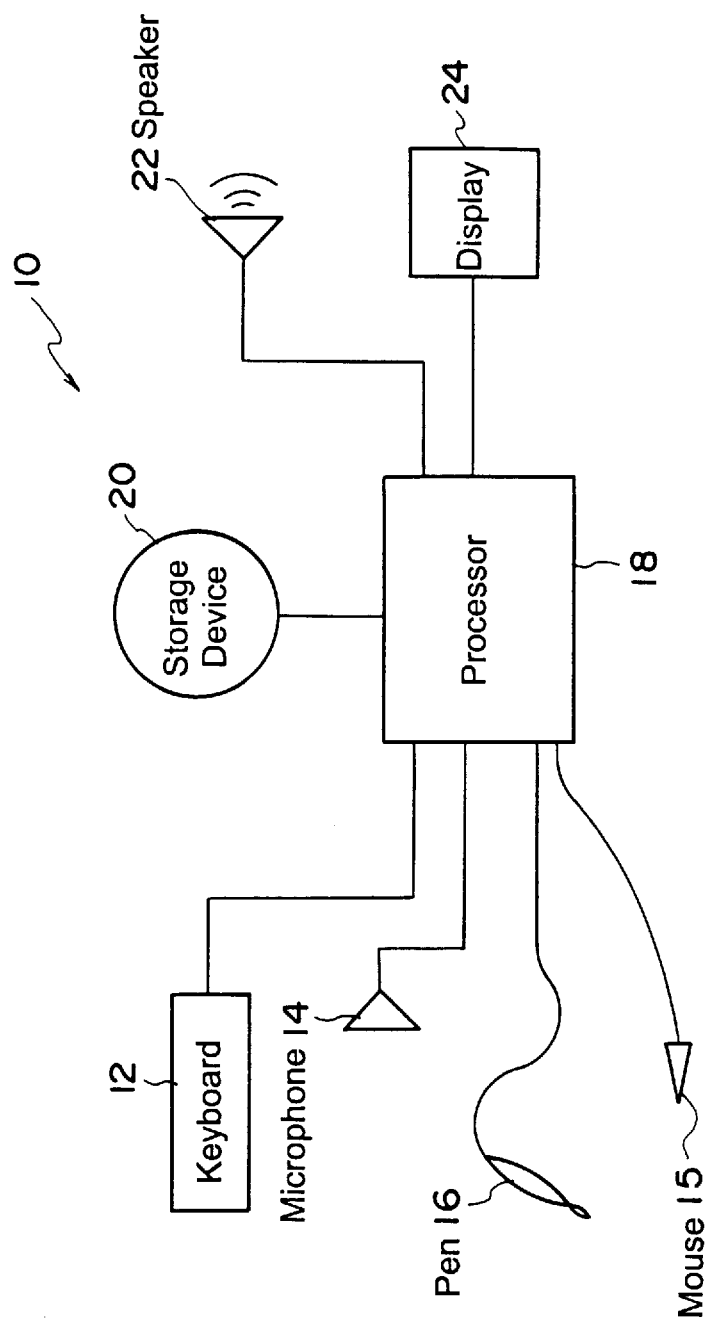
FIG. 1 is a block diagram of a system according to this invention.

As shown in FIG. 1 a graphic object inputting system 10 includes various input devices, such as a keyboard 12, a microphone 14, a mouse 15 and a pen 16. The processor 18 receives data from the input devices 12–16 and controls a memory or storage device 20, a speaker 22 and a display 24.

The display 24 displays various graphic objects entered onto the graphic object inputting system 10 via one or more of the input devices 12–16. When a user uses the pen 16, the user preferably draws on the display device 24, which also includes known circuits and sensors that convert strokes made by the pen 16 into graphical objects. These graphical objects are displayed on the display 24 at the location on the display 24 where the user made the strokes with the pen 16.

If the display is also displaying an electronic text or graphic file, the strokes made with the pen 16 can instead be "positioned" at the locations of the electronic file where the user made the strokes. In this case, the strokes are called "digital ink," as they are embedded in the electronic file in the same way marks made by an ink pen on paper are embedded on the paper.

The displayed graphic object can also be a mark entered via the keyboard 12. The graphic object can be textual, a drawing, or can be a graphical representation of, for example, audio data entered through the microphone 14.

Figure 2:
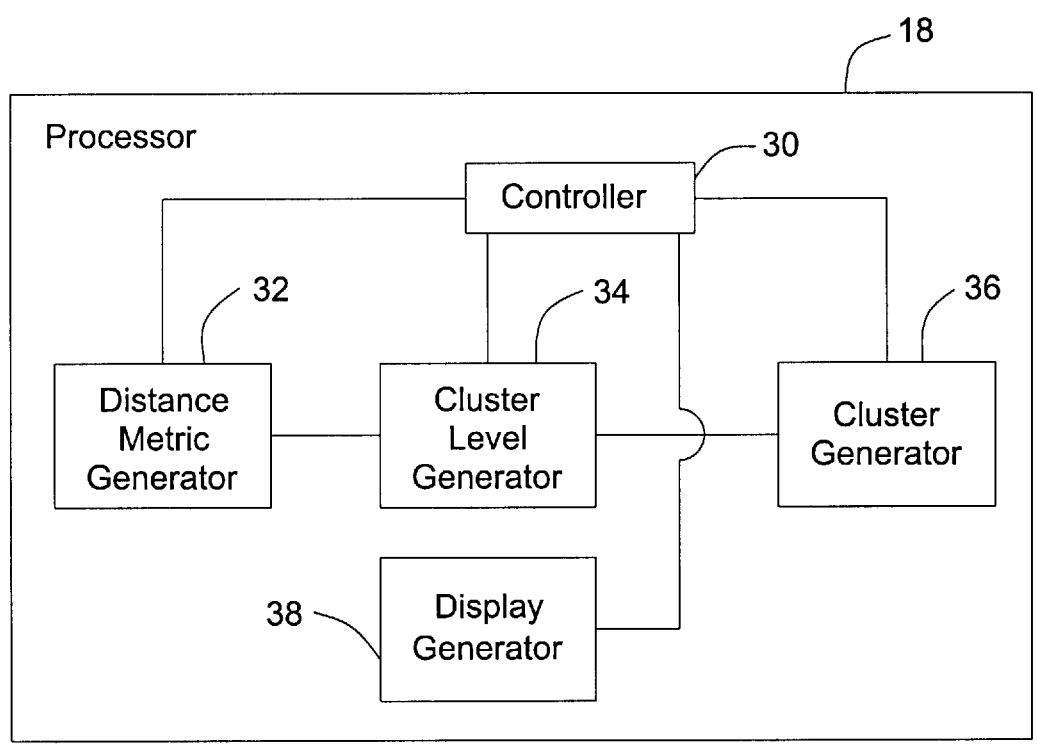
FIG. 2 is a block diagram of the processor of FIG. 1.

FIG. 2 shows the processor 18 in greater detail. The controller 30 controls and coordinates various processes and input devices. The controller 30 communicates with the storage device 20 and the display 24 to generate and display the graphic objects and the dynamic groups of the graphic objects. The controller is connected to a distance metric generator 32, a cluster level generator 34, a cluster generator 36 and a display generator 38. The distance metric generator 32 computes the different types of distance measures between the graphic objects and the clusters of the graphic objects.

The cluster level generator 34 generates a hierarchical agglomerative cluster tree from a collection of various graphic objects based upon the distance metrics for that collection output from the distance metric generator 32. Once the cluster levels are generated by the cluster level generator 34, the cluster generator 36 generates the dynamic groups of the graphic objects based on the cluster levels for a collection of graphic objects determined by the cluster level generator 34 or for a selected one of the graphic objects.

The cluster generator 36 communicates with the cluster level generator 34 and the controller 30. The cluster generator 36 generates the various groupings for the graphic objects, based on the cluster tree generated by the cluster level generator 34. The cluster generator 36 communicates with the display generator 38 to display the graphic objects on the display 24, as well as a cluster level or cluster levels associated with a grouping of the graphic objects or of a selected graphic object.

The system 10 can, as an example, be implemented in a system for capturing and retrieving hand-written and audio data, such as in U.S. application Ser. No. 08/821,311 filed on Mar. 20, 1997, incorporated herein by reference in its entirety. An example of a system in which the present invention has applicability is a portable electronic notebook that can input graphic objects, such as digital ink.

Figure 3:
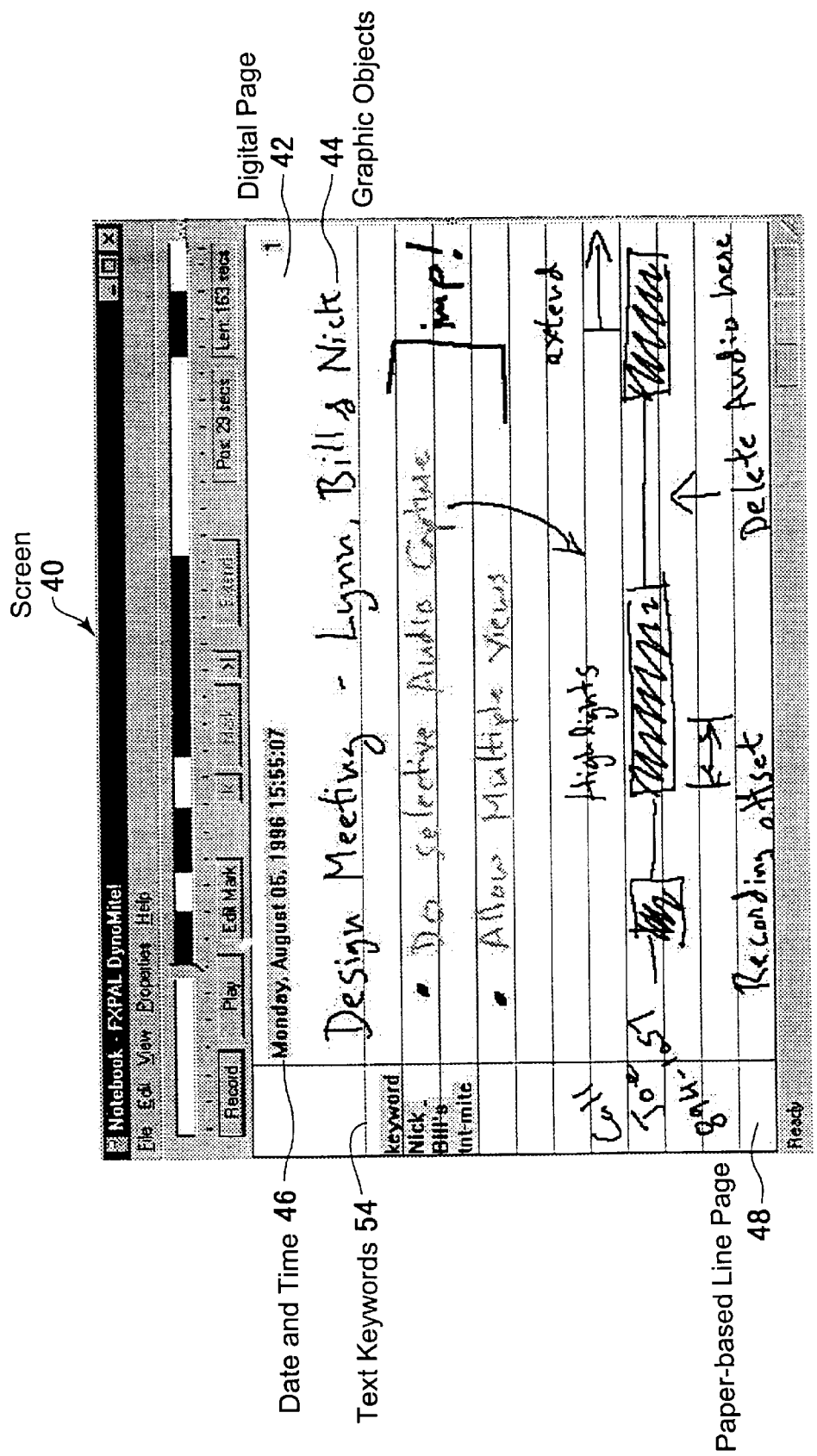
FIG. 3 shows a sample interface illustrating various graphic objects displayable on the display of FIG. 1.

FIG. 3 shows a screen 40 of the display 24 displaying an exemplary digital notepad having a digital page 42. Note marks or strokes as graphic objects 44 are entered on the digital page 42 and are stored in the storage device 20. The size of the digital page 42 is defined by the user. A date and time 46 is also associated with each digital page 42.

A background 48 for the digital page 42 is selected by the user. The background 48 shown in FIG. 3 is a paper-based line page with left margins. Other sample backgrounds can include plain white pages or other form-based pages that have predefined areas for specific information, such as names or Uniform Resource Locators (URLs).

Various gestures are available to assist the user in inputting the graphic objects. These gestures are entered to the processor 18 through the keyboard 12 or by using the pen 16 to mark on display 24. The gestures can be used to create new pages, space above or below a point of insertion, or delete or undo graphic objects. The gestures also serve as a user interface to select a graphic object and to select one or more associated cluster levels for the dynamic grouping of the graphic objects 44.

In FIG. 3, the text keywords 54 associated with a digital page 42 are displayed in the margin of the digital page 42. Keywords can be selected from previously determined keywords, typed in using a pop-up keyboard, or handwritten in a keyword entry box and recognized using a standard handwriting recognition package.

When enabled, audio data is received through the microphone 14. The audio data can be recorded and associated with a corresponding graphic object. When selected with a dynamic grouping of a plurality of the graphic objects, the corresponding audio data can be played through the speaker 22.

Various digital pages 42 or screens 40, each containing various ones of the graphic objects 44, are viewed on the display 24, with the digital pages 42 being ordered based on time of creation. Further, various groupings of the graphic objects 44 can be moved from one page 42 to another page 42 or from one screen 40 to another screen 40. Therefore, the graphic objects 44 can be added or deleted from groupings of graphic objects in a cluster tree on a digital page 42 and moved to another cluster tree on a different digital page 42 or screen 40.

The graphic objects 44, such as digital ink, are clustered using a hierarchical agglomerative clustering algorithm. The algorithm provides for the dynamic grouping of the graphic objects. Initially, each graphic object is its own cluster. The distance between the graphic objects is computed. A level of a cluster tree is defined based upon pairwise distance metrics formed by different types of distances, such as a combination of a time distance and a spatial distance.

Figure 4:
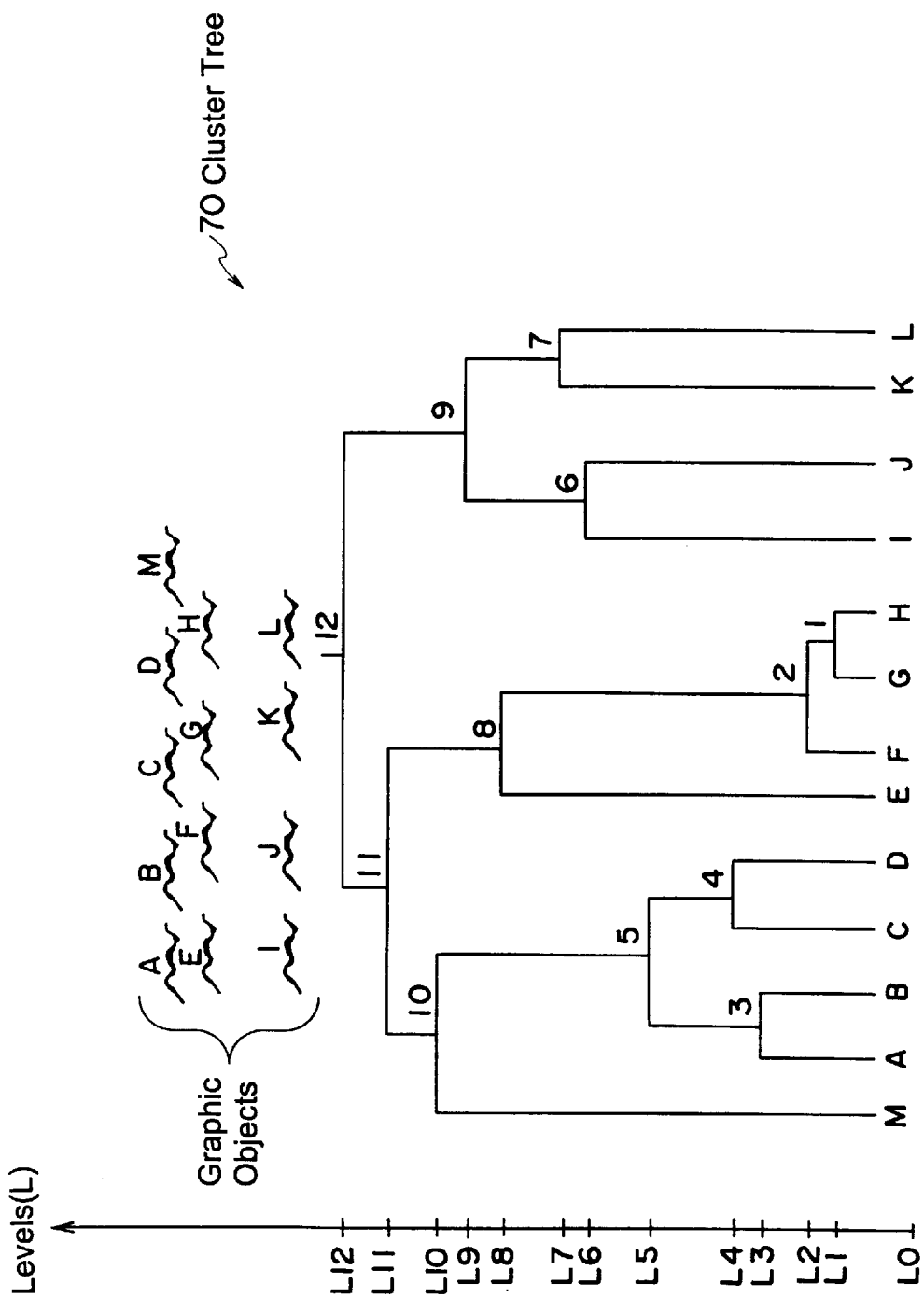
FIG. 4 shows one embodiment of a cluster tree resulting from clustering the graphic objects according to one embodiment of the method of this invention.

FIG. 4 shows a cluster tree 70 for a set of graphic objects A–M. As shown in FIG. 4, the graphic objects were created temporally in the order A–M, and are spatially located relative to each other as shown. Initially, each graphic object A–M is its own cluster at level L0. In generating the cluster tree 70, the pairwise time and space distances between each pair of the objects A–M are combined into a single metric. The two closest clusters are merged to form a single cluster, creating the first level, or level L1, of the cluster tree 70. The process is then repeated so that all pairwise combined distances for the cluster in existence at each level are examined and the two closest clusters in existence at each level are merged to form the next level of the cluster tree 70. Again, the process is repeated, as necessary, to form the additional levels until only a single cluster remains at the final level of the cluster tree 70.

Thus, as shown in FIG. 4, base clusters G and H are combined to form the level 1 G–H cluster. Then at level L2 of the cluster tree 70, the G–H and F clusters are combined to form the level 2 F–H cluster. Next, at levels L3 and L4, the A and B, and the C and D clusters are respectively combined to form the level 3 A–B and the level 4 C–D clusters.

Then, at level L5, the level 3 A–B cluster is combined with the level 4 cluster to form the level 5 A–D cluster. This process is repeated at each level until the final level 12 M–L cluster is formed.

Clustering of the graphic objects or for a selected graphic object can be selected and observed on the screen 40 of the display 24. For example, referring to FIG. 4, at level L5, the graphic objects A–D on the first line form a cluster, as do the graphic objects F–H on the second line. At the cluster level L9, the graphic objects I–L on the third line form a cluster, as do the graphic objects E–H on the second line and the graphic objects A–D on the first line. Thus, this cluster level is basically a line selection level.

The graphic object M is not included in the first line at this level since it was created at a later time. However, at level L10, the graphic object M is included in the first line cluster. At the cluster level L11, the first two lines have merged into a single cluster and include graphic objects A–H and M. At cluster level L12, all thirteen graphic objects A–M have merged into a single cluster. This level is thus equivalent to a paragraph, or page selection level.

Figure 5:
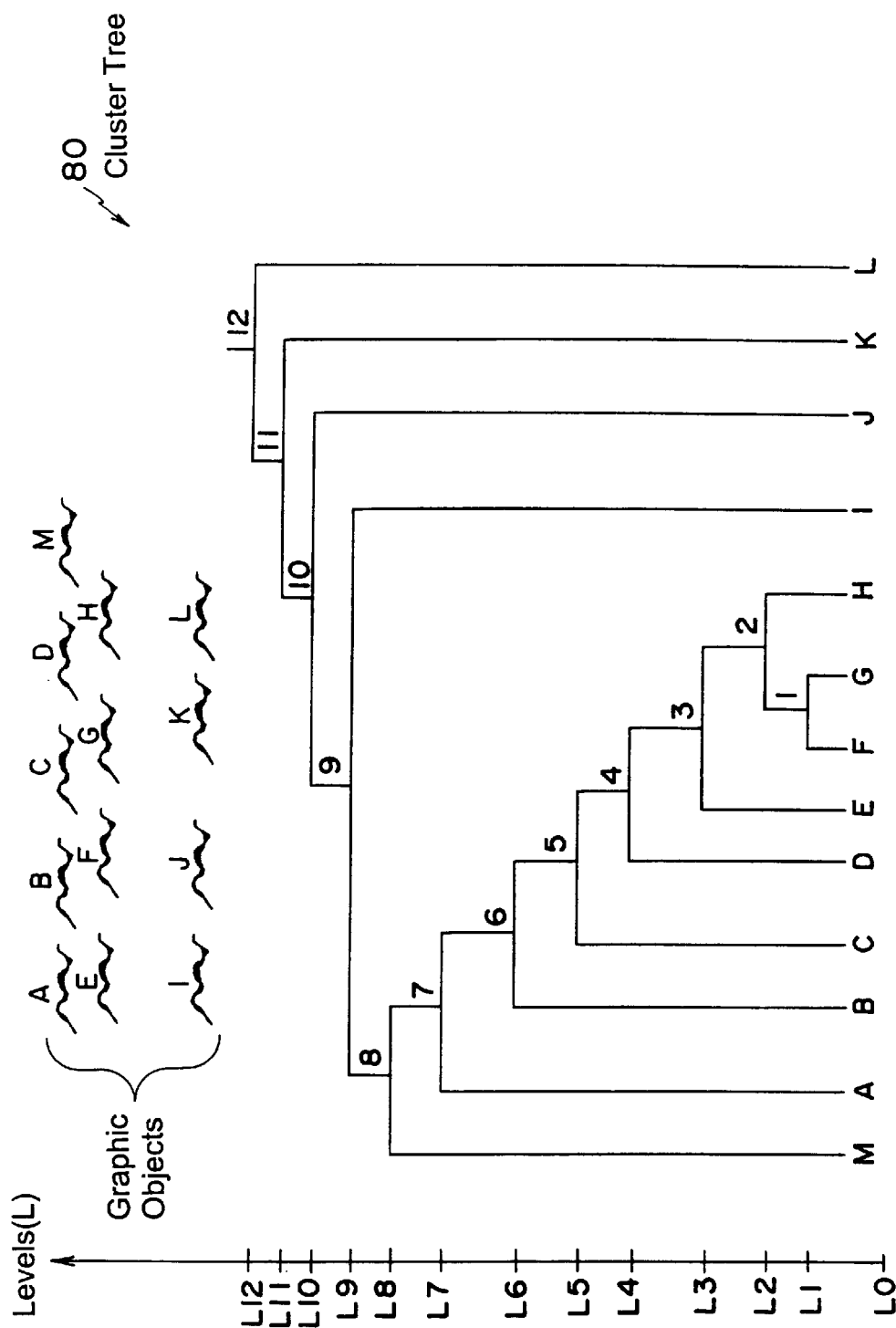
FIG. 5 shows another embodiment of a cluster tree resulting from clustering the graphic objects according to another embodiment of the method of this invention.

FIG. 5 shows a second cluster tree 80 of the graphic objects A–M, which was formed using an alternative algorithm to generate the cluster levels L1–L12. In FIG. 4, the cluster tree 70 is generated initially for a group of graphic objects after, but independently of, a graphic object selected by the user. In contrast, the cluster tree 80 shown in FIG. 5 is generated relative to an initially selected graphic object. Thus, in FIG. 5, the cluster tree 80 is determined based on the selected graphic object F. This alternative algorithm for generating the cluster tree 80 is based on the fact that a graphic object grouping for a selected graphic object changes only at small discrete levels.

Referring to FIG. 5, the user first selects a graphic object. For each level of the cluster tree 80, the next nearest graphic object is merged into the cluster that includes the selected graphic object. FIG. 5 shows the cluster tree 80 generated for the selected graphic object F. The distance metrics used to generate the cluster tree 80 are based on the pairwise combination of the time distance and the spatial distance of the graphic objects A–E and G–M from the selected graphic object F or from a cluster including the selected graphic object F.

The alternative algorithm of FIG. 5 provides a more gradual increase or decrease in the cluster size for any particular graphic object relative to the cluster tree 70. However, when compared to the cluster tree 70 the user has to move through many more levels in the cluster tree 80 to find an appropriate cluster level. For example, in the cluster tree 70 shown in FIG. 4 only four levels are needed to provide the range of clustering for the graphic object F, namely the cluster levels L2, L8, L11 and L12.

In contrast, using the alternative algorithm for the cluster tree 80, all levels L1–L12 are required. However, one advantage of the cluster tree 80 is that it allows the graphic object F, which is the graphic object selected by the user, to be grouped at exactly the desired cluster level. Thus, the cluster tree 80 allows the graphic object F to be grouped with, for example, the graphic objects E, G and H on the same line and the graphic object D on the previous line. This is not as easily accomplished with the cluster tree 70 shown in FIG. 4.

Figure 6:
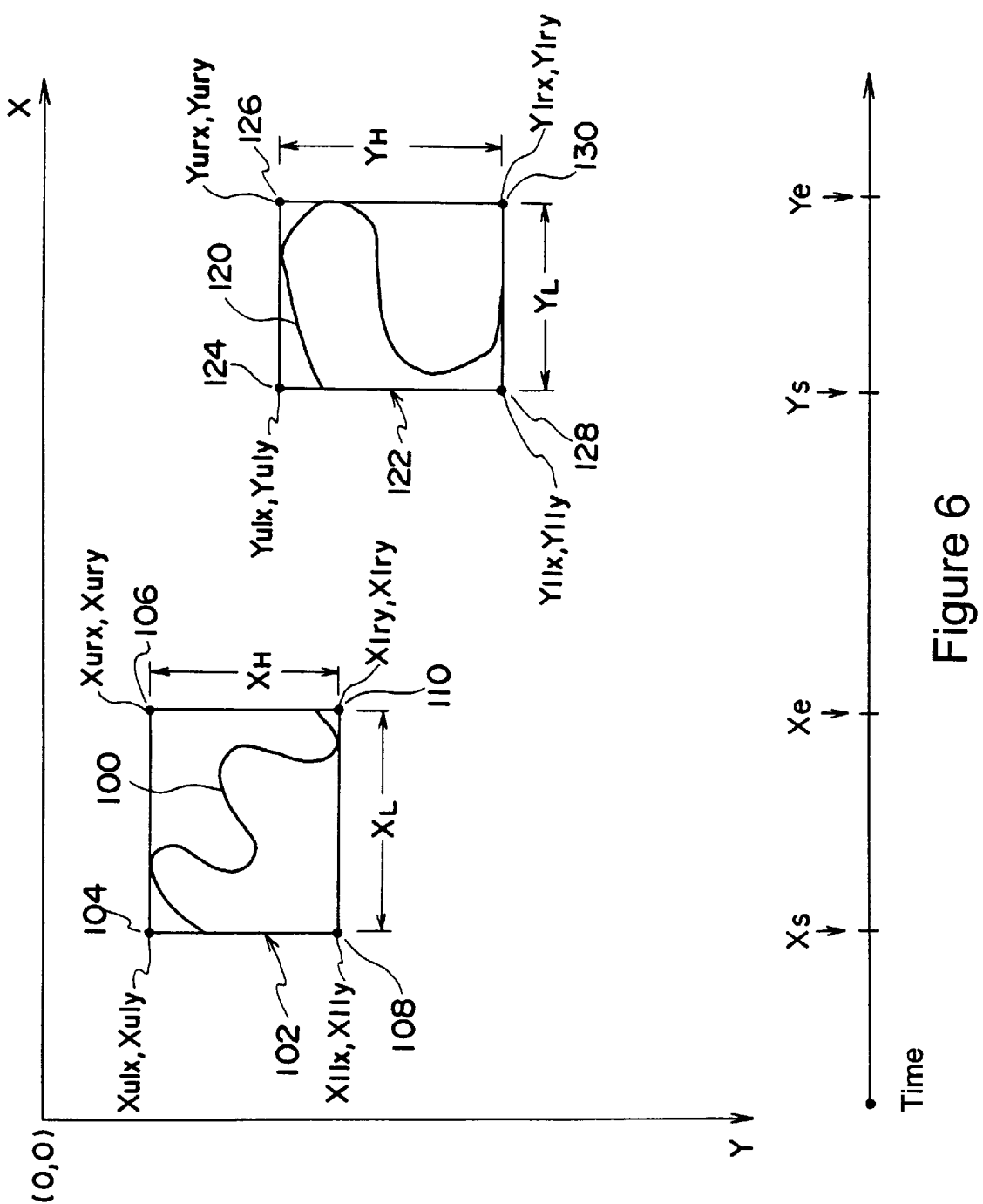
FIG. 6 shows a pair of exemplary graphic objects, and their bounding boxes relative to a directional coordinate system and a time axis, for hierarchical agglomerative clustering.
Figure 7A:
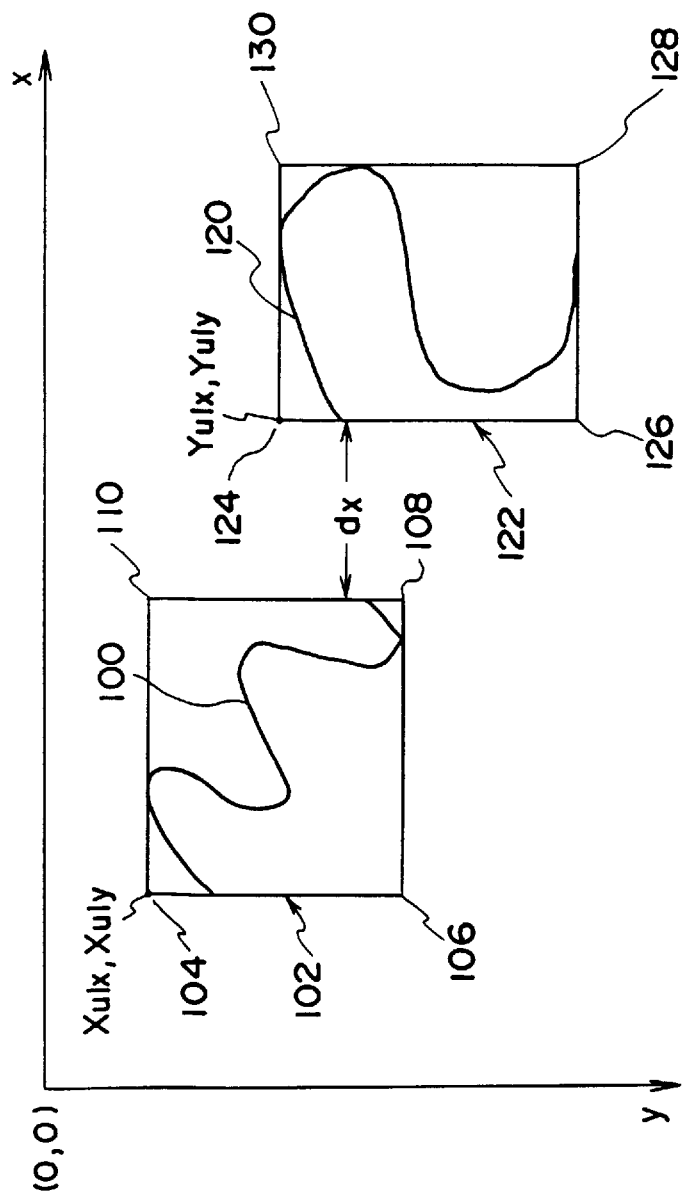
FIGS. 7A and 7B show a pair of exemplary graphic objects and their bounding boxes relative to coordinate axes for hierarchical agglomerative clustering in the present invention.
Figure 7B:
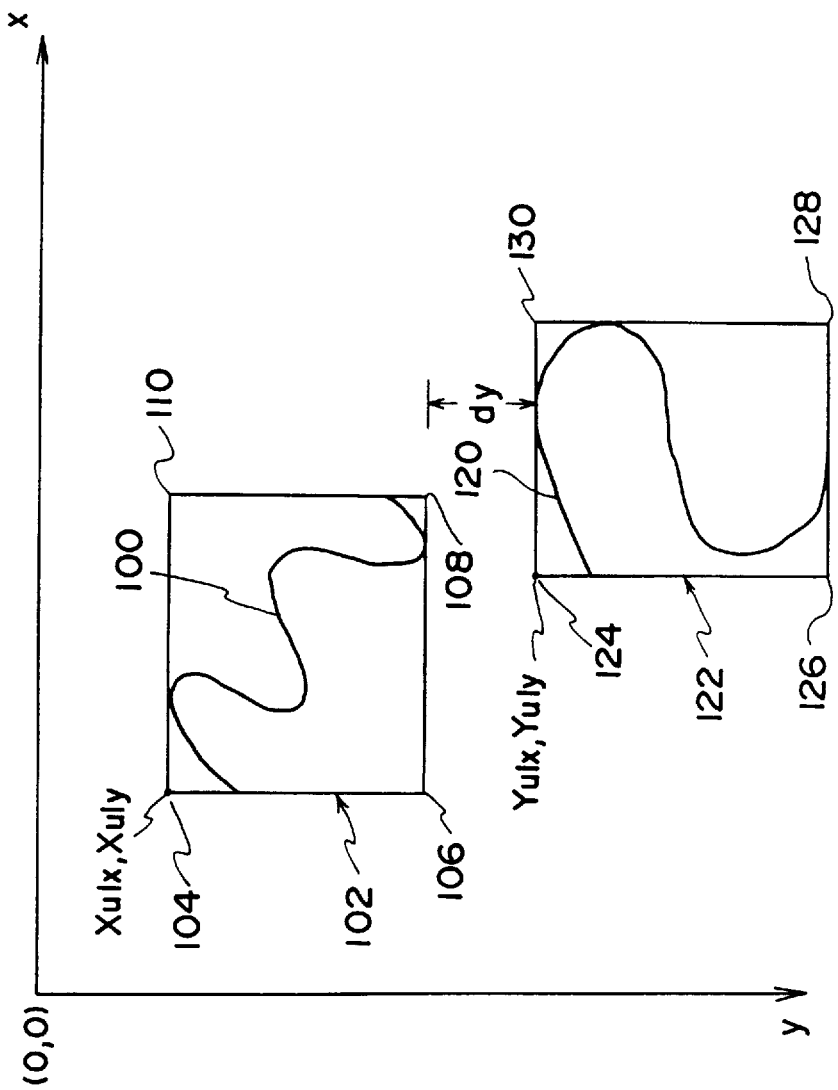

FIGS. 6, 7A and 7B, illustrate how the distance metrics are determined. These exemplary computations of the distance metrics apply to generating both the cluster tree 70 shown in FIG. 4 and the cluster tree 80 shown in FIG. 5. In computing the distance metrics, pairwise distances between the graphic objects or the clusters are preferably used. The pairwise distance between any two clusters of graphic objects is preferably the minimum of the pairwise distances between graphic objects contained in the clusters.

One way of determining the minimum pairwise distance (or distance metric) between two clusters of graphic objects is to determine each distance metric between each graphic object in one cluster and each graphic object in another cluster. Then, the smallest value for the distance metric of each such determined distance metric is selected as the minimum pairwise distance between the two clusters. Also, the maximum or average pairwise distance (or distance metric) between two clusters of graphic objects can alternately be used. In general, any known method of determining a distance metric between two clusters can be used.

Further, the distance metric between two graphic objects is preferably a joint function of the distance between the times they were created and the spatial distance between them.

One way of measuring the distance metric D between any two graphic objects 100 and 120 (X and Y) is:

$$D=D_T(X,Y)+\alpha D_S(X,Y), \quad (1)$$

where:

$D_S$ is the spatial distance between graphic objects X and Y;

$D_T$ is the time distance between creation of the graphic objects X and Y; and $\alpha$ is a constant that weights the spatial distance $D_S$ relative to the time distance $D_T$.

A preferred measure of the time distance, $D_T$ between the graphic objects X and Y, assuming graphic object X is made earlier in time than graphic object Y, is:

$$\begin{aligned} D_T(X,Y) &= M, \quad Y_s - X_e > M; \\ &= Y_s - X_e, \text{ otherwise}; \end{aligned} \quad (2)$$

where $X_e$ is an end-of-creation time for the graphic object X;

$Y_s$ is a start-of-creation time for the graphic object Y; and

M is a limiting constant on the time difference $D_T$.

The constant M therefore places an outer limit on the time distance $D_T$ between $X_e$ and $Y_s$.

One way of computing the spatial distance $D_S$ between the graphic objects X and Y is a weighted sum of the horizontal distance and the vertical distance:

$$D_S(X,Y)=d_x+\beta d_y. \quad (3)$$

where:

$d_x$ is the x (or horizontal) distance between a graphic object pair;

$d_y$ is the y (or vertical) distance between a graphic object pair; and $\beta$ is a constant specifying a relative importance of the $d_x$ and $d_y$ distances.

The constant $\beta$ is typically set to a value greater than one, since most users write along horizontal lines. This makes horizontal groupings more likely than vertical groupings.

The distance $d_x$ is the distance from the end of the graphic object X to the beginning of the graphic object Y in the x coordinate direction. The distance $d_y$ is the height difference between graphic object X and graphic object Y in the y coordinate direction. FIG. 7A illustrates the distance $d_x$ between the graphic objects X and Y, 100 and 120, respectively. Also, FIG. 7B illustrates the distance $d_y$ between the graphic objects X and Y.

Bounding boxes for the graphic objects 100 and 120 are preferably used in determining the spatial distance $D_S$. In FIGS. 6, 7A and 7B, the graphic objects 100 and 120, respectively, are shown bounded by the bounding boxes 102 and 122, respectively. The bounding boxes 102 and 122 are generally rectangular and minimally enclose the graphic objects 100 and 120. The bounding boxes 102 and 122 for the graphic objects 100 and 120 have four end point coordinates defining the line segments forming the rectangular bounding boxes 102 and 122. The bounding box for the graphic object 100 is defined by the points 104, 106, 108 and 110. The bounding box 122 for the graphic object 120 is defined by the points 124, 126, 128 and 130. Associated with each of these points is an x and y coordinate identifying the point in an x-y coordinate system.

In particular, as shown in FIGS. 6, 7A and 7B, the upper left points 104 and 124 have the coordinates $X_{ulx}$ and $X_{uly}$, and $Y_{ulx}$ and $Y_{uly}$, respectively; the upper right points 106 and 126 have the coordinates $X_{urx}$ and $X_{ury}$, and $Y_{urx}$ and $Y_{ury}$, respectively; the lower left points 108 and 128 have the coordinates $X_{llx}$ and $X_{lly}$, and $Y_{llx}$ and $Y_{lly}$, respectively; and the lower right points 110 and 130 have the coordinates $X_{lrx}$ and $X_{lry}$, and $Y_{lrx}$ and $Y_{lry}$, respectively.

One way of computing the distance $d_x$, as shown in FIG. 7A, is:

$$\begin{aligned} d_x &= \sigma_x, \quad \sigma_x > 0, \\ &= 0, \quad \sigma_x \leq 0 \end{aligned} \quad (4)$$

where $\sigma_x$ is defined as:

$$\sigma_x = Y_{ulx} - (X_{ulx} + X_L) \quad (5)$$

assuming:

$$Y_{ulx} > X_{ulx}. \quad (6)$$

where, as outlined above:

$Y_{ulx}$ is the upper left corner x coordinate for the bounding box 122;

$X_{ulx}$ is the upper left corner x coordinate of the bounding box 102; and $X_L$ is the width of the bounding box 102 along the x axis. In the example shown in FIG. 7B, $d_x=0$.

Similarly, one way of computing the distance $d_y$, as shown in FIG. 7B, is:

$$\begin{aligned} d_y &= \sigma_y, \quad \sigma_y > 0, \\ &= 0, \quad \sigma_y \leq 0, \end{aligned} \quad (7)$$

where $\sigma_y$ is defined as:

$$\sigma_y = Y_{uly} - (X_{uly} + X_H) \quad (8)$$

where:

$$Y_{uly} > X_{uly}, \quad (9)$$

$Y_{uly}$ is the upper left corner y coordinate of the bounding box 122;

$X_{uly}$ is the upper left corner y coordinate of the bounding box 102; and $X_H$ is the height of the bounding box 102 along the y axis.

If substantial variations exist in the size of the graphic objects, scaling the spatial distance $D_S$ based upon the graphic object size is usually necessary or desirable. One way of scaling the spatial distance $D_S$ between the graphic objects 100 and 120 is:

$$D_S(X,Y) = \frac{d_x}{b_x} + \beta \frac{d_y}{b_y} \quad (10)$$

where:

$$b_x = X_L + Y_L, \text{ and} \tag{11}$$

$$b_y = X_H + Y_H. \tag{12}$$

where:

$d_x$ is the x (or horizontal) distance between a graphic object pair;

$d_y$ is the y (or vertical) distance between a graphic object pair; and

β is a constant specifying a relative importance of $d_x$ and $d_y$;

$X_L$ is the width of the bounding box 102 along the x axis.

$X_H$ is the height of the bounding box 102 along the y axis.

$Y_L$ is the width of the bounding box 122 along the x axis.

$Y_H$ is the height of the bounding box 122 along the y axis.

Alternately, $b_x$ can be the maximum of $X_L$ and $Y_L$, and by can be the maximum of $X_H$ and $Y_H$. If scaling is not used, then $b_x$ and $b_y$ are set to one. Thus, Eq. 10 reduces to Eq. 3.

Figure 7C:
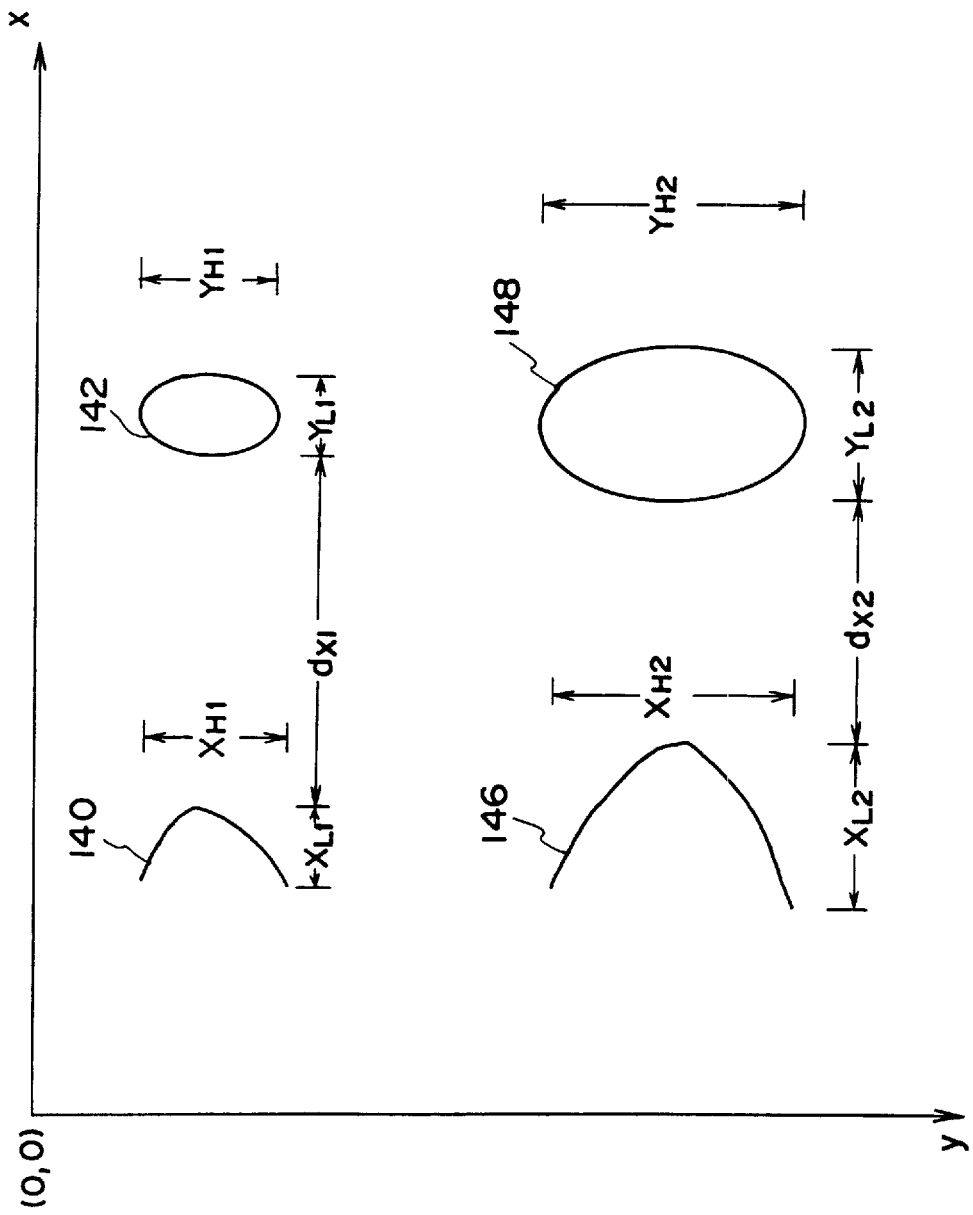
FIG. 7C illustrates a number of graphic objects of different sizes for scaling the spatial distance.

FIG. 7C shows one example of scaling the spatial distance. FIG. 7C shows graphic objects of varying size. The graphic objects 140 and 142 are relatively the same size. However, the graphic objects 146 and 148 are relatively the same size, but are significantly larger than the relative size of the graphic objects 140 and 142. Bounding boxes as in FIG. 6 for the graphic objects $X_1, Y_1, X_2$ and $Y_2$ (140, 142, 146, 148) have been omitted in FIG. 7C for ease of illustration.

To illustrate the advantages provided by scaling the spatial distance $D_S$, a non-scaled spatial distance $D_S$ for the graphic objects 140 and 142 is 4, and for graphic objects 146 and 148 is 8. It is determined as follows using Eq. 3:

As shown in FIG. 7C, for the pairs of graphic objects 140 and 142, and 146 and 148, the vertical distance $d_y$ is 0. For this example, $d_{x1}$, the distance between the graphic objects 140 and 142 along the x axis, is assumed to be 4. Similarly, $d_{x2}$, the distance between the graphic objects 146 and 148 along the x axis, is assumed to be 8. The spatial distance $D_S$ between the graphic objects 140 and 142 is thus:

$$\begin{aligned} D_S(X_1, Y_1) &= 4 + \beta(0), \\ &= 4, \end{aligned} \tag{13}$$

and the spatial distance between graphic objects 146 and 148 is:

$$\begin{aligned} D_S(X_2, Y_2) &= 8 + \beta(0), \\ &= 8. \end{aligned} \tag{14}$$

The spatial distance between the graphic objects 146 and 148 is thus twice the spatial distance between the graphic objects 140 and 142.

Alternately, if scaling is used to determine the spatial distance $D_S$, Eq. 10 is used. Again, as outlined above, $d_{x1}=4$, $d_{x2}=8$ and $d_y=0$. Additionally, the distance $X_{L1}$ is assumed to be 2, the distance $Y_{L1}$ is assumed to be 2, the distance $X_{L2}$ is assumed to be 4, the distance $Y_{L2}$ is assumed to be 4, the distance $X_{H1}$ is assumed to be 3, the distance $Y_{H1}$ is assumed to be 3, the distance $X_{H2}$ is assumed to be 6, and the distance $Y_{H2}$ is assumed to be 6. Based on these spatial distances, the scaling factors $b_x$ and $b_y$ between the graphic objects 140 and 142 are:

$$b_{x1} = 2+2 = 4,$$

$$b_{y1} = 3+3 = 6$$

Thus, the scaled spatial distance $D_{S1}$ between the graphic objects 140 and 142 is:

$$\begin{aligned} D_{s1}(X_1, Y_1) &= 4/4 + \beta(0/6) \\ &= 1. \end{aligned}$$

Similarly, the scaling factors $b_x$ and $b_y$ between the graphic objects 146 and 148 is:

$$b_{x2} = 4+4 = 8,$$

$$b_{y2} = 6+6 = 12.$$

Thus, the scaled spatial distance $D_{S2}$ between the graphic objects 146 and 148 is:

$$\begin{aligned} D_{S2}(X_2, Y_2) &= 8/8 + \beta(0/12) \\ &= 1 \end{aligned}$$

Thus, using scaling, $D_{S1}$ and $D_{S2}$ are both equal to 1. That is, scaling normalizes the spatial distances between graphic objects of varying size. Accordingly, although variations in graphic object size exist, scaling allows for dynamically grouping the graphic objects to provide for various cluster levels.

Figure 8:
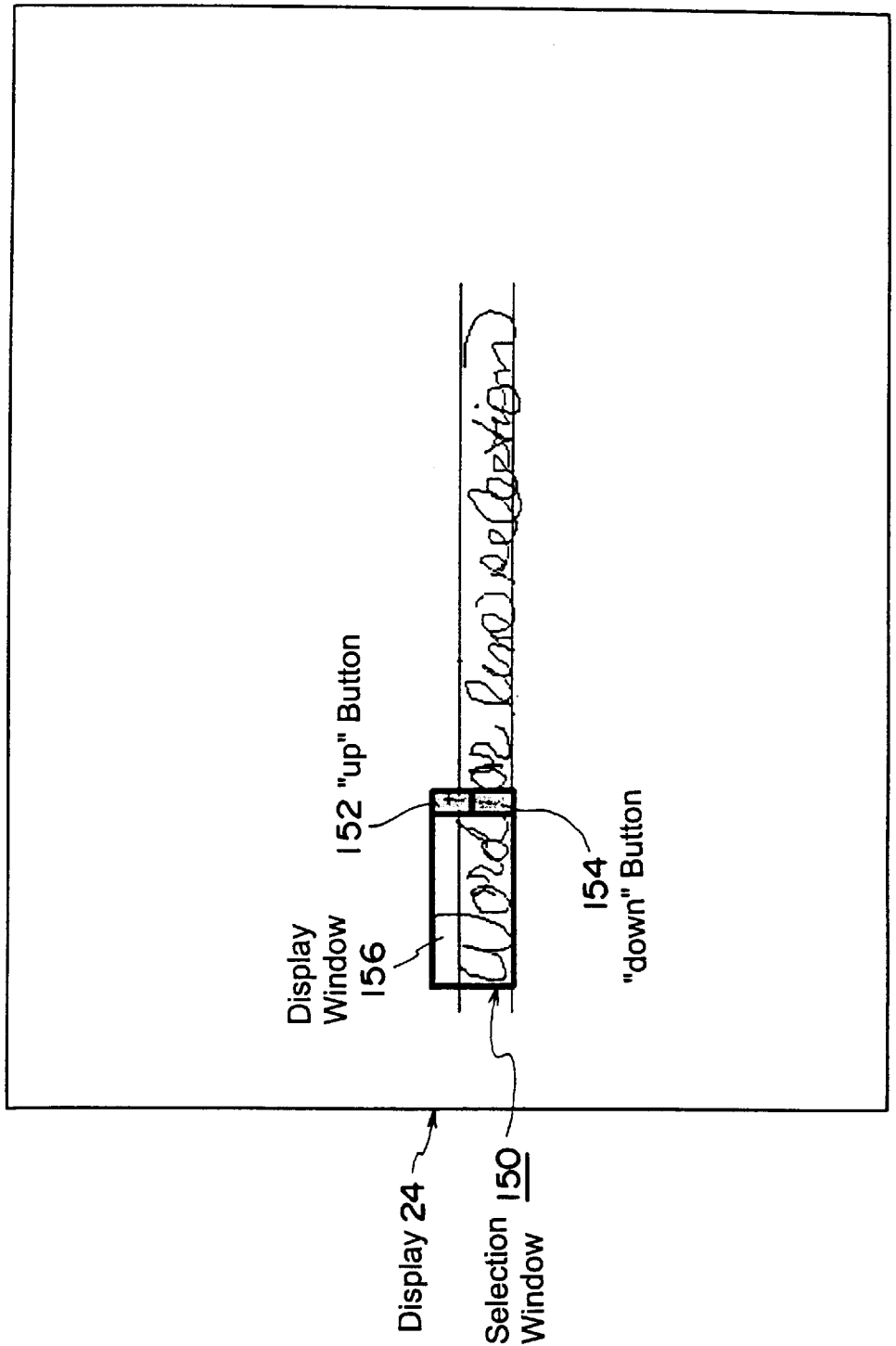
FIG. 8 shows a selection window for dynamically selecting the grouping level or the clustering level.

FIG. 8 shows a selection window 150 for selecting the graphic object and the cluster level. The user selects a graphic object (or objects) by pointing at the graphic object (or objects) on the display 24. In response, a display window 156 of the selection window 150 is positioned around the selected graphic object. Pointing is accomplished either by a keyboard instruction input from the keyboard 12, by using the mouse 15 or through pointing using the pen 16 on the display 24.

The system 10 shown in FIGS. 1 and 2 then creates the cluster tree and indicates the selected graphic object (or objects) by displaying them in the selection window 150. In addition, depending on the structure of the cluster tree and the default displayed cluster level, the system 10 may also display additional graphic objects in the selection window 150. For example, based on the cluster tree 70 shown in FIG. 4, if the default cluster level is level L9, and the graphic object L is selected, the graphic objects I–L would be shown in the selection box 150.

To select a grouping of the graphic objects based on the selected graphic object, the user increases or decreases the displayed cluster level. For example, in FIG. 4, the cluster levels that effect the groupings of the graphic object L as the selected graphic object, are the initial level L0 at which each graphic object is a single cluster, intermediate levels L7 and L9, and the final level L12 at which all graphic objects are grouped in a single cluster.

The selection window 150 shown in FIG. 8 also has an "up" button 152 to increase the selected cluster level and a "down" button 154 to decrease the selected cluster level. The "up" button 152 has a "+" button icon to show it increases the selected cluster level. In contrast, the "down" button has a "−" button icon to show it decreases the selected cluster level. The user "clicks" on the "up" button 152 to select the next higher cluster level. In contrast, "clicking" on the "down" button 154 selects the next lower cluster level. In response to selecting the next higher or lower cluster level, the selection window 150 is resized to include the graphic objects in the newly selected cluster level.

Therefore, to select a grouping for the graphic object L based on the cluster tree 70 shown in FIG. 4, a selection window 150 would enclose at least the graphic object L. If the default cluster level is set or the selected cluster is to level L0, the graphic object L is enclosed by the selection window 150 as a single graphic object, if level L7 the graphic objects K and L as a group, if level L9 the graphic objects I–L as a group, giving a line, and if level L12 all graphic objects A–M on the page as one cluster group. "Clicking" on the "up" or "down" buttons 152 and 154 is accomplished either by inputting an instruction through the keyboard 12, using the mouse 15 to point to and click on the appropriate button 152 or 154, or by pressing the pen 16 against the location of the display 24 where the appropriate button 152 or 154 is displayed. By repeating one of these actions, the user can cycle through the various cluster levels that change the grouping of the selected graphic object. Thus, after the final L12 cluster is shown, again selecting the "up" button 152 causes the initial level L0 to be shown on the selection window 150. Selecting the cluster levels can also be done by voice commands input through the microphone 14, such as "more" or "less". Alternately, the user can cycle through the cluster levels by holding, or dwelling on, the selection.

Figure 9:
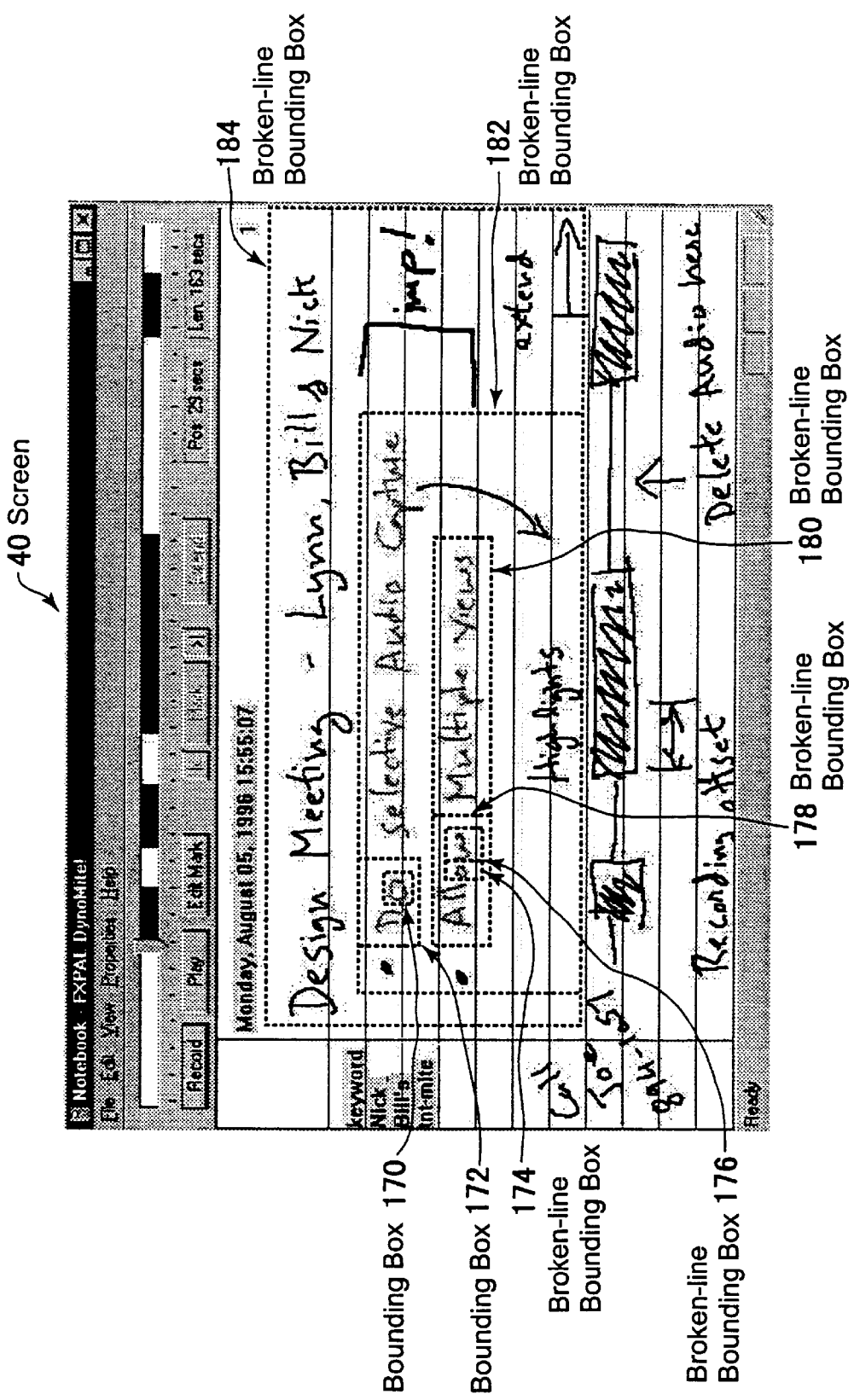
FIG. 9 shows the sample interface of FIG. 3 having graphic objects and various cluster levels or dynamic groupings of the graphic objects.

FIG. 9 shows the screen 40 with broken-line bounding boxes for various cluster levels of the graphic objects 44. The broken-line bounding boxes of FIG. 9, which represent the various cluster levels, are selected as discussed above.

In FIG. 9, bounding box 170 represents the display window 156 for the selected graphic object, the letter "o". In response to selecting the next higher cluster level, the display window 156 corresponds to the bounding box 172, the word "Do". Selecting another graphic object, such as the "o" in "Allow" resets the selection window.

Typically, the default level is set or is reset to the previously chosen level. In this case, for example, assume the default level is level L0 and corresponds to the "o" in "Allow". The display window 156 will thus display only the graphic object "o". This is shown by the broken-line bounding box 174. Increasing the cluster level by selecting the "up" button 152, enlarges the display window 156 to display the level L1 cluster, comprising the graphic objects "o" and "w". This is illustrated by the broken-line bounding box 176.

Again increasing the cluster level enlarges the display 156 to display the next cluster level that includes the "o". This is illustrated by the broken-line bounding box 178, which encloses the word group "Allow". Increasing the cluster level further enlarges the display window 156 to show the line group, represented by the broken-line bounding box 180, the subparagraph group, represented by the broken-line bounding box 182, and the paragraph group, represented by the broken-line bounding box 184.

Thus, the broken-line bounding boxes 174–184 illustrate the various cluster levels associated with portions of a word, a word, a line, related lines, or a paragraph for graphical editing. Although not shown in FIG. 9, a bounding box could include all of the information within the screen 40 to include the entire page of the graphic objects.

The graphic objects within the selected cluster level currently selected by the user are preferably shown by altering some appearance characteristic of the graphic objects within the selected cluster, rather than the bounding box described above. The appearance characteristic can be shadowing, background shading or coloring, altering the color of the ink, such as the hue, saturation or luminance, or altering the font attribute, boldness, slant, or any other appearance characteristic. This allows unclustered objects that would otherwise fall within the bounding box to be distinguished from the objects within the cluster.

Figure 10:
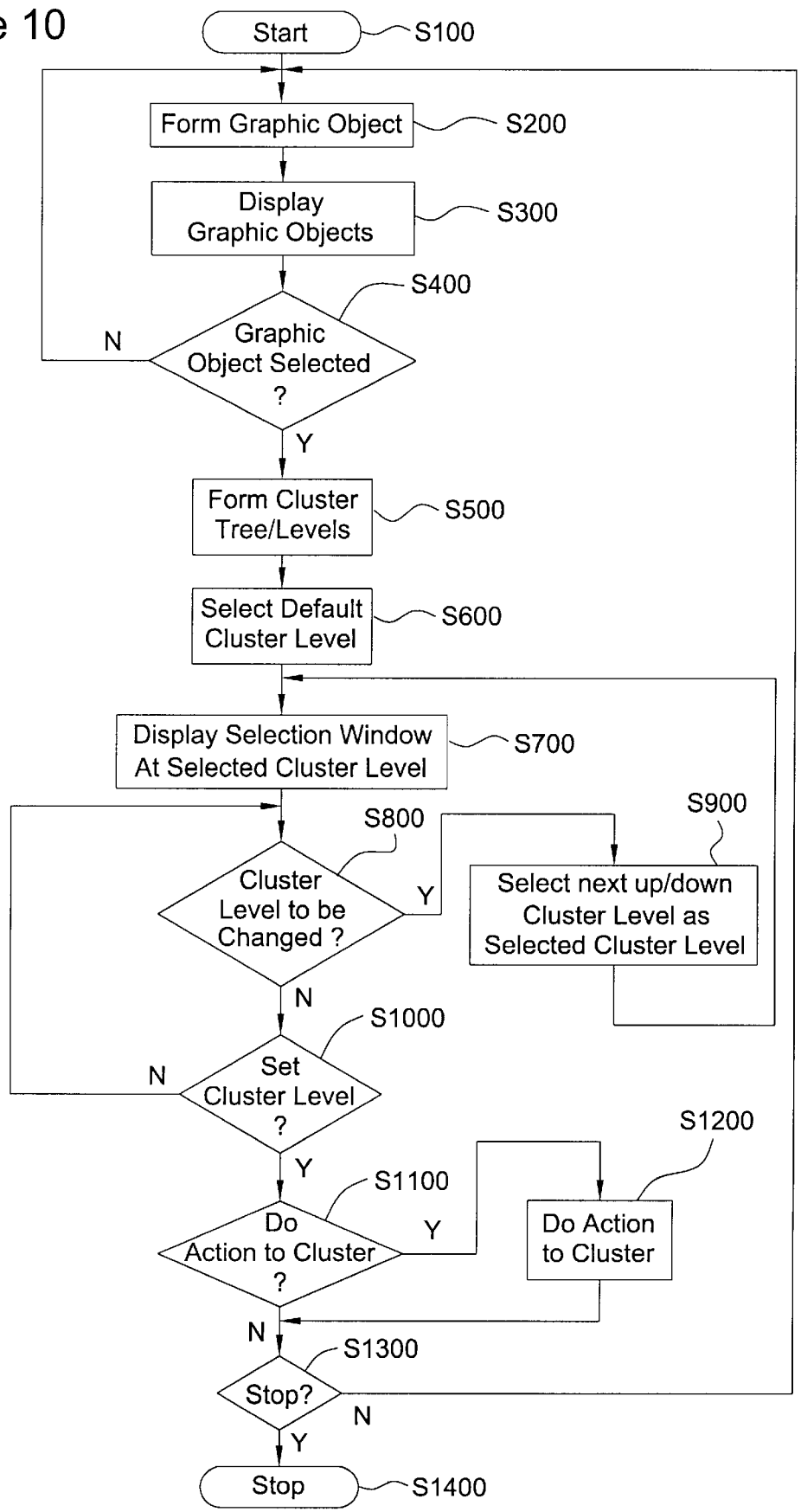
FIG. 10 is a flowchart outlining the method for dynamically grouping the graphic objects and selecting the desired dynamic cluster level.

FIG. 10 is a flow chart outlining one embodiment of the method for dynamically grouping a plurality of graphic objects.

As shown in FIG. 10, the control routine starts at step S100. In step S200, a graphic object is formed on the display 24. Then, in step S300, the graphic objects are displayed on the display 24. Next, in step S400, the control routine determines if a graphic object has been selected. If not, control jumps back to step S200. The control routine then loops through steps S200–S400 until a graphic object is selected. In step S400, once a graphic object is selected, control proceeds to step S500.

In step S500, the cluster tree and the cluster levels are formed for the displayed graphic objects. Next, in step S600, the default cluster level is selected as the selected cluster level. The default cluster level can of course be any predetermined cluster level, such as the previously chosen level, or can be a level selected by the user. Then, in step S700, the selection window is displayed on the display 24, with the display window 156 enclosing the selected graphic object, and, based on the selected cluster level, zero or more additional graphic objects. Control then continues to step S800.

In step S800, the control routine determines if the selected cluster level is to be changed as outlined above. If so, control continues to step S900. Otherwise, control jumps to step S1000. In step S900, the control routine sets the new cluster level as the selected cluster level. Control then jumps back to step S700.

In step S1000, if the user is satisfied with the selected cluster level, the cluster level is set. Otherwise, the control then jumps back to step S800. Then, in step S1100, the control routine determines if an action is to be done to the cluster. Actions can include moving the cluster to a different portion of the displayed digital page or to a different digital page. Other actions could include deleting the graphic objects of the selected cluster level from the cluster tree or adding additional graphic objects to that group. If, in step S1100, an action is to be done to the selected cluster level, control continues to step S1200. Otherwise, control continues to step S1300.

In step S1200, the selected action is done to the selected graphic objects. Control returns to step S1300. In step S1300, the control routine determines if the graphical editing process is to be stopped, by closing the program running on the system 10, or the like. If so, control continues to step S1400, and stops. If not, control returns to step S200.

The cluster level is preferably selected by pointing to a graphic object and altering the cluster level based on the duration of the selection, or dwell, rather than using the interface shown in FIG. 8. That is, a selected graphic object is selected using some pointing device, such as a pointer icon controlled by a mouse or other selection device, or such as a pen. The cluster level is then controlled by the dwell.

That is, while holding the pen against the screen at the position of the selected graphic object, the cluster level is continually increased at some appropriate rate. The cluster level is then selected by lifting the pen from the screen. If the cluster level reaches the top level without the pen being lifted, the selected cluster level can either cycle back to the base cluster level of only the selected graphic object, or can being decreasing. In this case, if the base cluster level is reached, the selected cluster level can again be increased.

This same set of steps would occur if the graphic object was pointed to by some other pointing device, such as a pointer icon controlled by a mouse. By selected that graphic object by pressing a mouse button, the cluster level would be continually changed at the appropriate rate until the mouse button was released.

Figure 11:
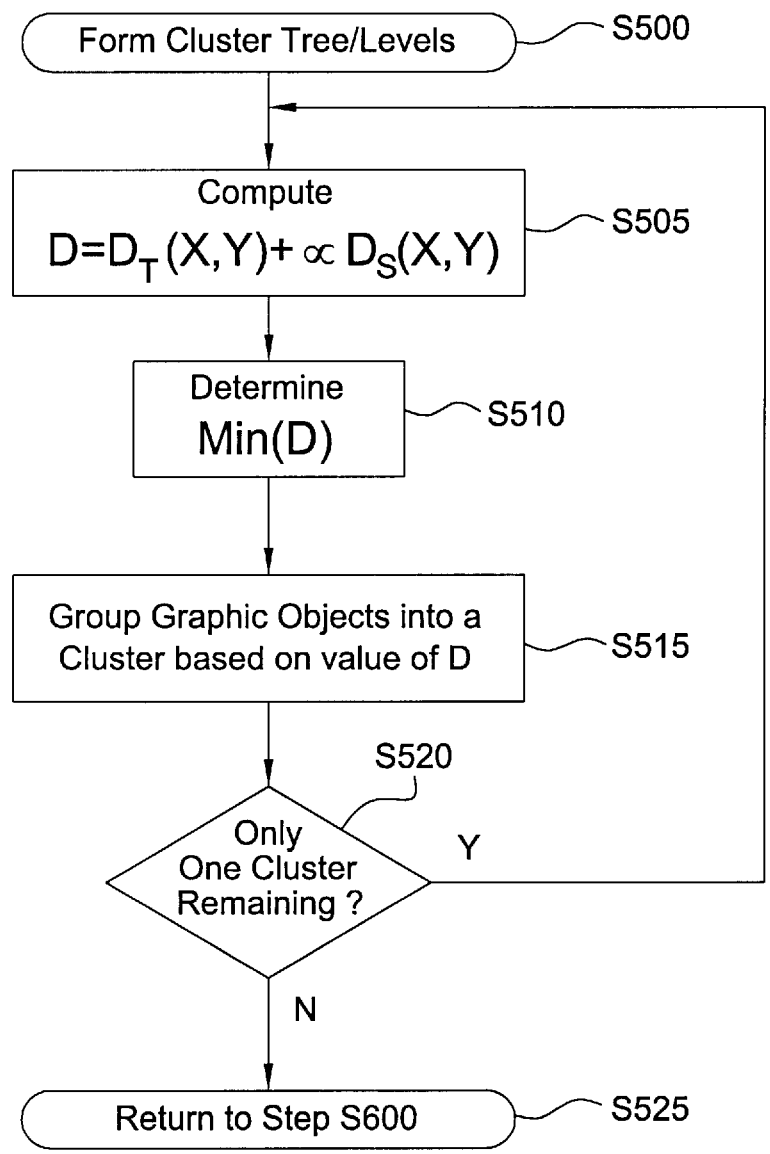
FIG. 11 is a flowchart showing in greater detail forming the cluster levels to form the cluster tree illustrated in FIG. 4.

FIG. 11 is a flow chart showing in greater detail one embodiment of the cluster tree/cluster levels forming step S500 of FIG. 10. In particular, the flow chart of FIG. 11 creates the cluster tree shown in FIG. 4. Starting in step S500, control continues to step S505, where the pairwise distance metrics for the displayed graphic objects are determined. As outlined above, the distance metric D is a combination of different types of distances, such as a spatial distance and a time distance. Initially, each graphic object is its own cluster. The pairwise distance D between each pair of clusters is determined, for example by one of the previously discussed ways. Next, in step S510, the minimum pairwise distance is located. Then, in step S515, the clusters having the minimum pairwise distance D are grouped into the next level cluster. Control then continues to step S520.

In step S520, the control routine determines if there is only a single cluster of the displayed graphic objects remaining at the next cluster level. If not, control returns to step S505, where the pairwise distances D are updated based on the newly formed cluster formed in step S515. Otherwise, control continues to step S525, as the top level cluster has been formed. In step S525, control returns to step S600.

Figure 12:
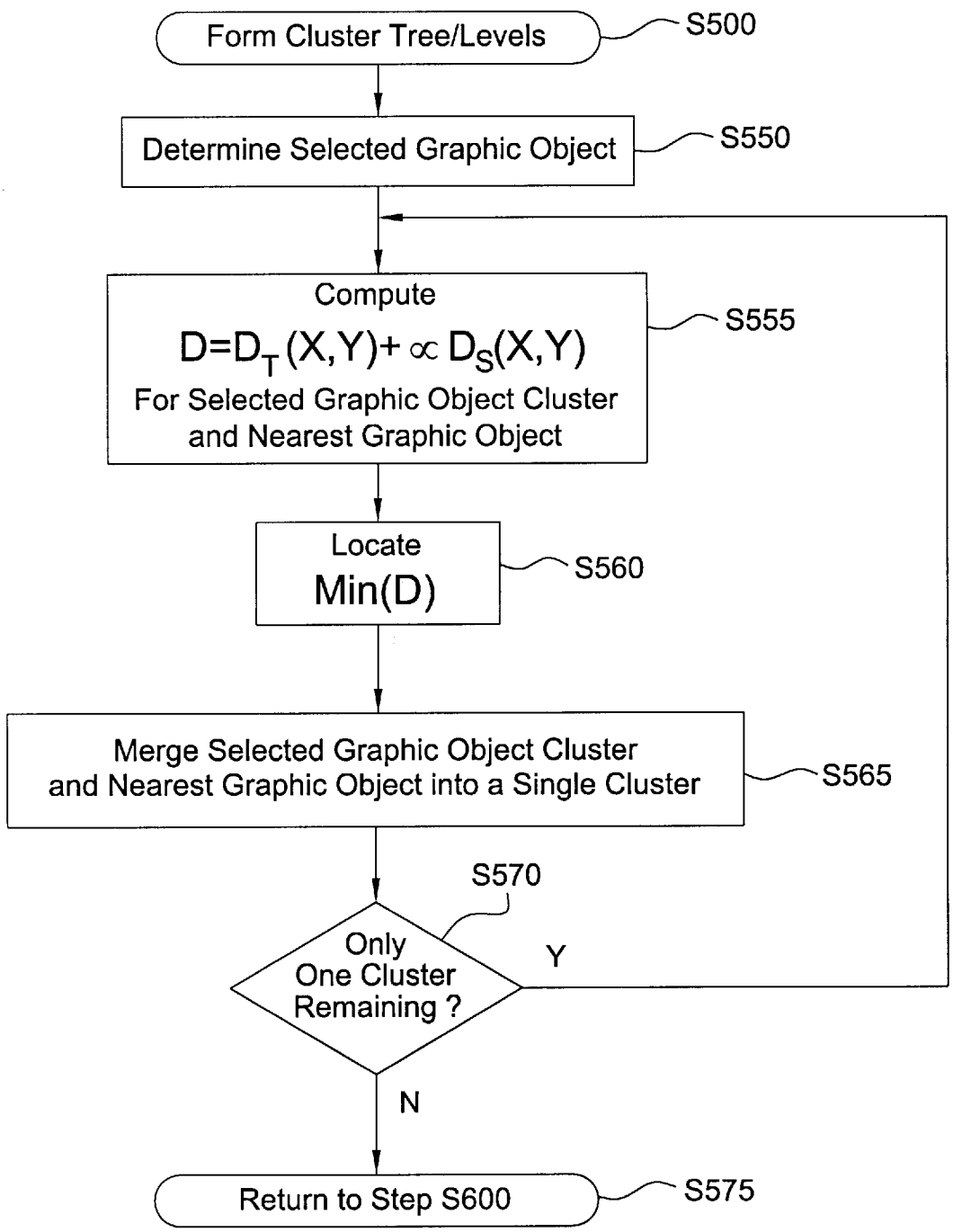
FIG. 12 is a flowchart showing in greater detail forming the cluster levels to form the cluster tree illustrated in FIG. 5.

FIG. 12 is a flow chart showing in greater detail a second embodiment of the cluster tree/cluster level forming step S500 of FIG. 10. In particular, the flow chart of FIG. 12 creates the cluster tree shown in FIG. 5. Starting in step S500, control continues to step S550. In step S550, the control routine determines which graphic object was selected in step S400. Then, in step S555, the distance metrics D are determined for each other displayed graphic object from or relative to the selected graphic object. It should be appreciated that, in step S555, the graphic objects are treated as clusters, and the distance metrics are computed between the current cluster containing the selected graphic object and the other clusters.

Then, in step S560, the minimum distance metric is determined. The distance metric (or pairwise distance) is determined between each graphic object in the current cluster containing the selected graphic object and each graphic object not in the current cluster, with the smallest value for all such determined distance metrics being the minimum distance metric. Next, in step S565, the cluster containing the selected graphic object and the cluster corresponding to the minimum distance metric are merged, for the next level, into a single cluster. Control then continues to step S570.

In step S570, the control routine determines if only a single cluster of the displayed graphic objects remains after merging in step S565. If not, the next level cluster becomes the current level cluster containing the selected graphic object. Control then returns to step S555. Otherwise, if only a single cluster remains, the top level cluster has been formed. In this case, control continues to step S575. In step S575, control returns to step S600.

As shown in FIGS. 1 and 2, the system 10 for dynamically grouping a plurality of graphic objects is preferably implemented on a programmed general purpose computer. However, the system 10 can also be implemented on a special purpose computer, a programmed microprocessor or microcontroller and peripheral integrated circuit elements, an ASIC or other integrated circuit, a hardwired electronic or logic circuit such as a discrete element circuit, a programmable logic device such as a PLD, PLA, FPGA or PAL, or the like. In general, any device on which a finite state machine capable of implementing the flow charts shown in FIGS. 10–12 can be used to implement the process for dynamically grouping a plurality of graphic objects of the invention.

The method and apparatus for dynamically grouping a plurality of graphic objects of this invention is applicable to a device which stores text, particularly handwritten text, such as a portable electronic notebook for capturing or retrieving handwritten or audio notes or to systems that produce drawings, particularly from handwritten drawings. Therefore, while this invention has been described in conjunction with the specific embodiments outlined above, it is evident that many alternatives, modifications and variations will be apparent to those skilled in the art. Accordingly, the embodiments of the invention set forth above are intended to be illustrative, not limiting. Various changes may be made without departing from the spirit and scope of the invention as defined in the following claims.

What is claimed is:

1. A method for dynamically grouping a plurality of graphic objects displayed on a graphic input display device, comprising:

determining at least one distance, each distance being between a pair of graphic objects and based on a plurality of different types of distance measures; and forming a cluster tree for the graphic objects based upon each determined distance, each cluster level of the cluster tree defining one new cluster of the graphic objects.

2. The method of claim 1, further comprising:

selecting at least one graphic object;

displaying a graphic object group including the selected at least one graphic object, based on an associated cluster level on the graphic input display device.

3. The method of claim 2, further comprising:

selecting another cluster level of the cluster tree whose corresponding cluster contains the selected at least one graphic object; and displaying on the graphic input display device another graphic object group based on the selected cluster level.

4. The method of claim 3, wherein selecting another cluster level includes at least one of:

using an up/down interface to select the cluster level;

using a gesture recognition device to select the cluster level;

using a voice response device to select the cluster level; and determining the cluster level based on a duration of selection of the at least one graphic object.

5. The method of claim 2, wherein the associated cluster level is predetermined.

6. The method of claim 5, wherein the predetermined cluster level corresponds to one of a graphic object, a word, a line, a paragraph or a page.

7. The method of claim 2, wherein selecting at least one graphic object includes at least one of:

using an up/down interface to select the at least one graphic object;

using a gesture recognition device to select the at least one graphic object; and using a voice response device to select the at least one graphic object.

8. The method of claim 1, wherein forming the cluster tree comprises:

selecting one of the graphic objects; and forming the cluster tree based on the selected graphic object.

9. The method of claim 1, wherein each distance is a function of a time distance and a spatial distance.

10. The method of claim 9, further comprising scaling the spatial distance based on relative sizes of the plurality of graphic objects.

11. The method of claim 9, wherein, for each pair of graphic objects X and Y the distance is:

$$D=D_T(X,Y)+\alpha D_S(X,Y)$$

where:

D is the pairwise distance;

$D_T$ is the pairwise time distance;

$D_S$ is the pairwise spatial distance; and $\alpha$ is a constant relating the time distance to the spatial distance.

12. The method of claim 11, wherein:

$$D_S = d_x + \beta d_y,$$

where $d_x$ is a distance between the graphic object X and the graphic object Y along the horizontal coordinate direction;

$d_y$ is a distance between the graphic object X and the graphic object Y in the vertical coordinate direction; and $\beta$ is a constant specifying a relative importance of the $d_x$ and $d_y$ distances.

13. The method of claim 11, wherein:

$$D_S = \frac{d_x}{b_x} + \beta \frac{d_y}{b_y},$$

$$b_x = X_L + Y_L, \text{ and}$$

$$b_y = X_H + Y_H,$$

where:

$X_L$ is the length of the graphic object X in a horizontal coordinate direction;

$Y_L$ is the length of the graphic object Y in the horizontal coordinate direction;

$X_H$ is the height of the graphic object X in the vertical coordinate direction;

$Y_H$ is the height of the graphic object Y in the vertical coordinate direction; and $\beta$ is a constant defining a relative importance of the $d_x$ and $d_y$ distances.

14. The method of claim 11, wherein:

$$D_T = M, Y_s - X_e > M, = Y_s - X_e, \text{ otherwise,}$$

where:

M is a constant defining a limiting time between the creation of graphic object X and graphic object Y;

$X_e$ is the end time for the creation of graphic object X; and $Y_s$ is the start time for the creation of graphic object Y.

15. A method for dynamically grouping a plurality of graphic objects displayed on a graphic input display device, comprising:

initially grouping each of the plurality of graphic objects as its own cluster;

determining at least one pairwise distance, each pairwise distance being between a pair of the clusters and based on a combination of a time distance between creation of the pair of clusters and a spatial distance between the pair of clusters; and merging the pair of clusters closest to each other based on the at least one pairwise distance to form a single cluster and a cluster level.

16. The method of claim 15, further comprising repeating, for each successive cluster level, the determining and the merging steps until at most one cluster exists after the merging step.

17. The method of claim 15, further comprising scaling the spatial distance based upon relative sizes of the plurality of graphic objects.

18. The method of claim 15, wherein, for each pair of graphic objects X and Y the distance is:

$$D=D_T(X,Y)+\alpha D_S(X,Y)$$

where:

D is the pairwise distance;

$D_T$ is the pairwise time distance;

$D_S$ is the pairwise spatial distance; and $\alpha$ is a constant relating the time distance to the spatial distance.

19. The method of claim 18, further comprising:

selecting at least one graphic object;

displaying a graphic object group including the selected at least one graphic object, based on an associated cluster level on the graphic input display device.

20. The method of claim 19, further comprising:

selecting another cluster level of the cluster tree whose corresponding cluster contains the selected at least one graphic object; and displaying on the graphic input display device another graphic object group based on the selected cluster level.

21. The method of claim 19, wherein the associated cluster level is predetermined.

22. The method of claim 21, wherein the predetermined cluster level corresponds to one of a graphic object, a word, a line, a paragraph or a page.

23. The method of claim 15, further comprising:

selecting at least one graphic object;

displaying a graphic object group including the selected at least one graphic object, based on an associated cluster level on the graphic input display device.

24. The method of claim 23, further comprising:

selecting another cluster level of the cluster tree whose corresponding cluster contains the selected at least one graphic object; and displaying on the graphic input display device another graphic object group based on the selected cluster level.

25. The method of claim 24, wherein selecting another cluster level includes at least one of:

using an up/down interface to select the cluster level;

using a gesture recognition device to select the cluster level;

using a voice response device to select the cluster level; and determining the cluster level based on a duration of selection of the at least one graphic object.

26. The method of claim 23, wherein selecting the at least one graphic object includes at least one of:

using an up/down interface to select the at least one graphic object;

using a gesture recognition device to select the at least one graphic object;

using a voice response device to select the at least one graphic object; and determining the cluster level based on a duration of selection of the at least one graphic object.

27. The method of claim 15, further comprising: selecting one of the graphic objects from the plurality of graphic objects, and wherein the determining step determines a pairwise distance between a cluster including the selected graphic object and each other graphic object to determine the graphic object closest to the cluster including the selected graphic object, and wherein the merging step merges the cluster containing the selected graphic object and the closest graphic object to define a single cluster.

28. The method of claim 27 further comprising repeating, for each successive cluster level, the determining and the merging steps until at most one cluster exists after the merging step.

29. The method of claim 27, wherein, for each pair of graphic objects X and Y the distance is:

$$D = D_T(X,Y) + \alpha D_S(X,Y)$$

where:

D is the pairwise distance;

$D_T$ is the pairwise time distance;

$D_S$ is the pairwise spatial distance; and $\alpha$ is a constant relating the time distance to the spatial distance.

30. The method of claim 29, further comprising scaling the spatial distance based upon relative sizes of the plurality of graphic objects.

31. The method of claim 29, further comprising:

selecting at least one graphic object; and displaying a graphic object group including the selected at least one graphic object, based on an associated cluster level on the graphic input display device.

32. The method of claim 31, further comprising:

selecting another cluster level of the cluster tree whose corresponding cluster contains the selected at least one graphic object; and displaying on the graphic input display device another graphic object group based on the selected cluster level.

33. The method of claim 32, wherein selecting another cluster level includes at least one of:

using an up/down interface to select the cluster level;

using a gesture recognition device to select the cluster level;

using a voice response device to select the cluster level; and determining the cluster level based on a duration of selection of the at least one graphic object.

34. The method of claim 31, wherein selecting the at least one graphic object includes at least one of:

using an up/down interface to select the at least one graphic object;

using a gesture recognition device to select the at least one graphic object;

using a voice response device to select the at least one graphic object; and determining the cluster level based on a duration of selection of the at least one graphic object.

35. A system for dynamically grouping a plurality of graphic objects, comprising:

a graphic input display device for at least displaying the plurality of graphic objects;

a control system communicating with the graphic input display device, the control system forming a cluster tree of the plurality of graphic objects by combining different types of distance measures between at least one pair of graphic objects to form each level of the cluster tree; and a memory for storing the graphic objects and the cluster tree.

36. The system of claim 35, wherein the control system comprises:

a distance metric generator that determines a distance metric for at least one pair of graphic objects based on the different types of distance measures;

a cluster level generator that generates the cluster levels of the cluster tree based on at least one distance metric generated by the distance metric generator;

a cluster generator that generates the cluster tree; and a display generator that generates a display of the graphic objects on the graphic input display device based on the cluster tree.

37. The system of claim 36, further comprising a selector usable to select a graphic object and usable to select a cluster level associated with the selected graphic object.

38. The system of claim 37, wherein the selector includes at least one of:

an up/down interface;

a gesture recognition device;

a voice response device; and a selecting device, wherein the cluster level is determined based on a duration of selection of the at least one graphic object by the selection device.

39. The system of claim 36, wherein the distance metric generator determines the distance metric between each pair of the graphic objects, the pairwise distance metric being a combination of a time distance and a spatial distance.

40. The system of claim 39, wherein, for each pair of graphic objects X and Y, the distance metric is:

$$D = D_T(X,Y) + \alpha D_S(X,Y)$$

where:

D is the pairwise distance metric;

$D_T$ is the pairwise time distance;

$D_S$ is the pairwise spatial distance; and $\alpha$ is a constant relating the time distance to the spatial distance.

* * * * *